United States Patent
Liu et al.

(10) Patent No.: US 10,412,383 B2
(45) Date of Patent: Sep. 10, 2019

(54) COMPRESSING GROUPS OF VIDEO FRAMES USING REVERSED ORDERING

(71) Applicant: GOOGLE LLC, Mountain View, CA (US)

(72) Inventors: Yuxin Liu, Palo Alto, CA (US); Di Chen, LaFayette, IN (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 46 days.

(21) Appl. No.: 15/677,305

(22) Filed: Aug. 15, 2017

(65) Prior Publication Data
US 2019/0058880 A1     Feb. 21, 2019

(51) Int. Cl.
*H04N 19/00*       (2014.01)
*H04N 19/105*     (2014.01)
(Continued)

(52) U.S. Cl.
CPC ......... *H04N 19/105* (2014.11); *H04N 19/103* (2014.11); *H04N 19/114* (2014.11); *H04N 19/124* (2014.11); *H04N 19/137* (2014.11); *H04N 19/159* (2014.11); *H04N 19/177* (2014.11); *H04N 19/36* (2014.11); *H04N 19/51* (2014.11); *H04N 19/52* (2014.11); *H04N 19/61* (2014.11); *H04N 19/82* (2014.11); *H04N 19/13* (2014.11); *H04N 19/91* (2014.11)

(58) Field of Classification Search
CPC .. H04N 19/105; H04N 19/124; H04N 19/159; H04N 19/177; H04N 19/36; H04N 19/52; H04N 19/61; H04N 19/82; H04N 19/13; H04N 19/91
See application file for complete search history.

(56) References Cited

U.S. PATENT DOCUMENTS 5,590,122 A    12/1996   Sandorfi et al.
5,745,181 A *  4/1998    Wilkinson ............. H04N 19/61
                                                         375/240.15
(Continued)

OTHER PUBLICATIONS

Bankoski, et al., "Technical Overview of VP8, An Open Source Video Codec for the Web", Jul. 11, 2011, 6 pp.
(Continued)

*Primary Examiner* — Zhihan Zhou
(74) *Attorney, Agent, or Firm* — Young Basile Hanlon & MacFarlane, P.C.

(57) ABSTRACT

Groups of video frames can be compressed using reversed ordering. For a group of a video sequence having a display order, a determination is made as to whether to arrange the group in a reversed display order before a prediction process of an encoder for the group. Responsive thereto, the group is arranged in the reversed display order as an input order to the prediction process. Otherwise, the group is provided to the prediction process in the display order as the input order. In performing the prediction process, the group, received in the input order, is arranged in a coding order using a group coding structure that defines at least one backward reference frame for inclusion within a set of candidate reference frames. Multiple backward reference frames may also be defined. The group is predicted in the coding order using the set of candidate reference frames.

15 Claims, 12 Drawing Sheets

US 10,412,383 B2
Page 2

(51) Int. Cl.

| | |
|---|---|
| *H04N 19/159* | (2014.01) |
| *H04N 19/124* | (2014.01) |
| *H04N 19/61* | (2014.01) |
| *H04N 19/82* | (2014.01) |
| *H04N 19/177* | (2014.01) |
| *H04N 19/36* | (2014.01) |
| *H04N 19/52* | (2014.01) |
| *H04N 19/51* | (2014.01) |
| *H04N 19/103* | (2014.01) |
| *H04N 19/114* | (2014.01) |
| *H04N 19/137* | (2014.01) |
| *H04N 19/13* | (2014.01) |
| *H04N 19/91* | (2014.01) |

(56) References Cited

U.S. PATENT DOCUMENTS

| | | | |
|---|---|---|---|
| 6,141,447 A | 10/2000 | Linzer et al. | |
| 6,473,558 B1* | 10/2002 | Wu | H04N 5/783 386/290 |
| 6,580,829 B1* | 6/2003 | Hurst, Jr. | H04N 19/46 348/456 |
| 6,731,684 B1 | 5/2004 | Wu | |
| 7,983,339 B2* | 7/2011 | Francois | H04N 19/105 375/240.01 |
| 8,634,467 B2 | 1/2014 | Au et al. | |
| 2003/0202580 A1* | 10/2003 | Noh | H04N 9/8042 375/240.03 |
| 2004/0066847 A1* | 4/2004 | Adachi | H04N 19/50 375/240.13 |
| 2008/0219393 A1* | 9/2008 | Toma | G11B 27/005 375/240.12 |
| 2008/0273858 A1* | 11/2008 | Wald | G11B 27/031 386/347 |
| 2009/0304080 A1* | 12/2009 | Francois | H04N 19/105 375/240.15 |
| 2011/0109721 A1 | 5/2011 | Hong et al. | |
| 2017/0094316 A1 | 3/2017 | Sullivan | |

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion in PCT/US2018/031582, dated Jul. 5, 2018, 13 pgs.
H. Schwarz et al., "Overview of the Scalable Video Coding Extension of the H.264/AVC Standard", IEEE Transactions on Circuits and Systems for Video Technology, vol. 17, No. 9, Sep. 1, 2007, pp. 1103-1120.

* cited by examiner

… (1)

COMPRESSING GROUPS OF VIDEO FRAMES USING REVERSED ORDERING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

This disclosure relates generally to encoding and decoding video data and more particularly relates to compressing groups of video frames using reversed ordering for encoding and decoding the video data.

This disclosure describes encoding methods and apparatuses. A method according to an implementation of the disclosure includes, before a prediction process of an encoder for a group of frames, determining whether to arrange the group of frames in a reversed display order. The group of frames is formed of a proper subset of frames of a video sequence having a display order. The method also includes, responsive to a determination to arrange the group of frames in the reversed display order, arranging the group of frames in the reversed display order before the prediction process for the group of frames, and performing the prediction process for the group of frames. Performing the prediction process can include receiving the group of frames as input to the prediction process in an input order, the input order comprising one of the display order or the reversed display order, arranging the group of frames, received in the input order, in a coding order using a group coding structure that defines at least one backward reference frame for inclusion within a set of candidate reference frames, and predicting the group of frames in the coding order using the set of candidate reference frames.

The disclosure also describes decoding methods and apparatuses. A method according to an implementation of the disclosure includes determining, from an encoded bitstream, whether a prediction process of an encoder received a group of frames as input in one of a display order or a reversed display order, and performing a prediction process of a decoder for the group of frames. The group of frames is formed of a proper subset of frames of a video sequence having the display order, and performing the prediction process includes receiving, from the encoded bitstream, the group of frames as input to the prediction process of the decoder in a coding order arranged using a group coding structure that defines at least one backward reference frame for inclusion within a set of candidate reference frames, and predicting the group of frames in the coding order using the set of candidate reference frames. The method also includes generating a decoded group of frames using prediction results of the prediction process, and, responsive to a determination that the prediction process of the encoder received the group of frames as input in the reversed display order, buffering the decoded group of frames, and outputting the buffered decoded frames in the display order.

An apparatus according to an implementation of the disclosure comprises a non-transitory storage medium or memory and a processor. The medium includes instructions executable by the processor to carry out a method including determining, from an indication in an encoded bitstream, whether a prediction process of an encoder received a group of frames in an input order, the input order comprises one of a display order or a reversed display order, and the group of frames formed of a proper subset of frames of a video sequence having the display order. The method also includes performing a prediction process of a decoder for the group of frames by receiving, from the encoded bitstream, the group of frames as input to the prediction process of the decoder in a coding order arranged using a group coding structure that modifies the input order such that an individual frame of the group of frames input to the prediction process before an adjacent, preceding frame only if the individual frame is used as a backward prediction frame within a set of candidate reference frames, and predicting the group of frames in the coding order using the set of candidate reference frames. The method also includes generating a decoded group of frames using prediction results of the prediction process, and, responsive to the input order being the reversed display order, buffering each of the decoded group of frames until all of the frames of the decoded group of frames are generated, and outputting the buffered decoded frames in the display order only after all of the frames of the decoded group of frames are buffered.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views unless otherwise noted.

DETAILED DESCRIPTION

Figure 1:
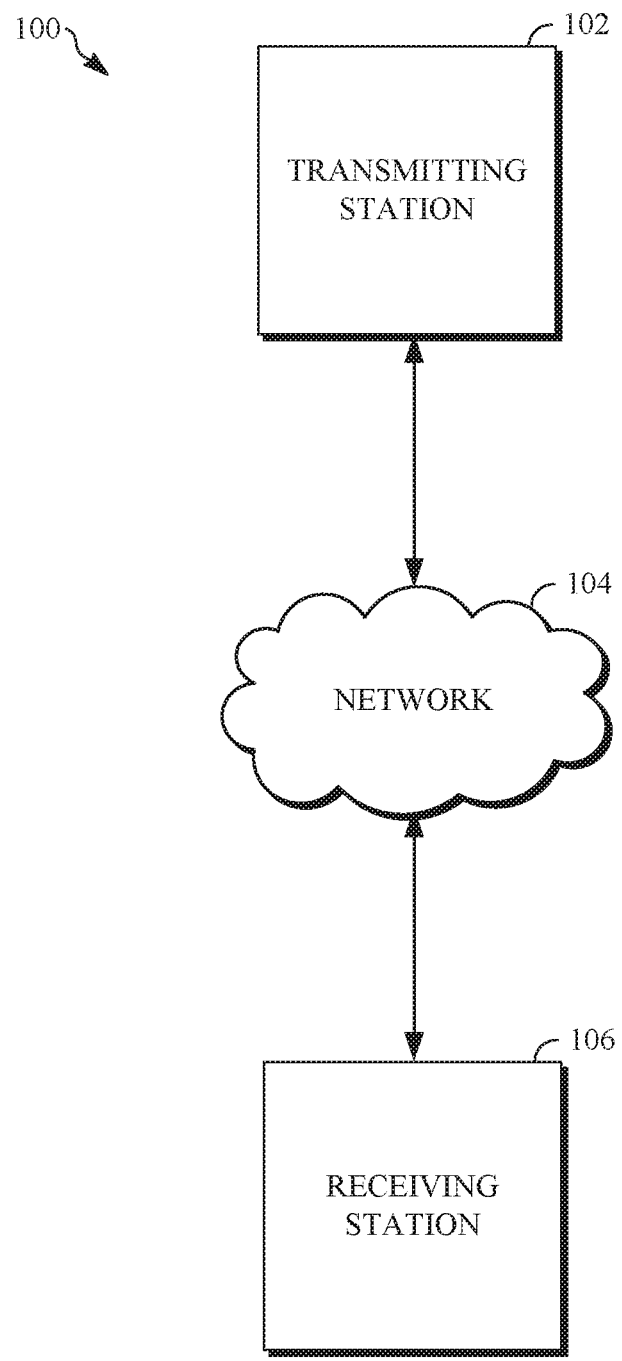
FIG. 1 is a schematic of a video encoding and decoding system.

A video stream can be compressed by a variety of techniques to reduce bandwidth required transmit or store the video stream. A video stream can be encoded into a bitstream, which involves compression, which is then transmitted to a decoder that can decode or decompress the video stream to prepare it for viewing or further processing. Compression of the video stream often exploits spatial and temporal correlation of video signals through spatial and/or motion compensated prediction. Inter-prediction, for example, uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block.

Each motion vector used to generate a prediction block in the inter-prediction process refers to a frame other than a current frame, i.e., a reference frame. Reference frames can be located before or after the current frame in the sequence of the video stream. In some cases, there may be three reference frames used to encode or decode blocks of the current frame of the video sequence. One is a frame that may be referred to as a golden frame. Another is a most recently encoded or decoded frame. The last is an alternative reference frame that is encoded or decoded before one or more frames in a sequence, but which is displayed after those frames in an output display order. In this way, the alternative reference frame is a reference frame usable for backwards prediction. The efficacy of a reference frame when used to encode or decode a block within a current frame can be measured based on a resulting signal-to-noise ratio or other measures of rate-distortion.

The video frames may be coded in groups of frames, sometimes called groups of pictures or golden-frame groups. Each group contains a series of successive video frames, such as 4 to 16 frames. Successive groups are coded in the display order, while a video frame within a group may be coded out of the display order only if it is to be available as a backward reference frame during the inter-prediction process.

Implementations of this disclosure include coding whereby the video frames within a group may be input to the inter-prediction process in one of two different orders—either in the display order or in a reversed display order. A bit is signaled at the start of a group that informs a decoder as to which order is used for the group. The bit may be included in a header for the group of frames in some implementations. If the bit is set to indicate the frames within the group are coded in the reversed display order, the decoder can buffer all of the coded frames and reorder them when the group is entirely decoded and ready to output to display. By reversing the sequence of frames within a group, different frames are available as reference frames for the subsequent inter-prediction process than those available when the sequence of frames within the group is considered in the display order. Coding efficiency can be improved for groups of frames.

Further details of using reversed ordering to compress groups of video frames, including the decision process for a group regarding when to use reversed ordering, are described herein with initial reference to a system in which reversed ordering can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
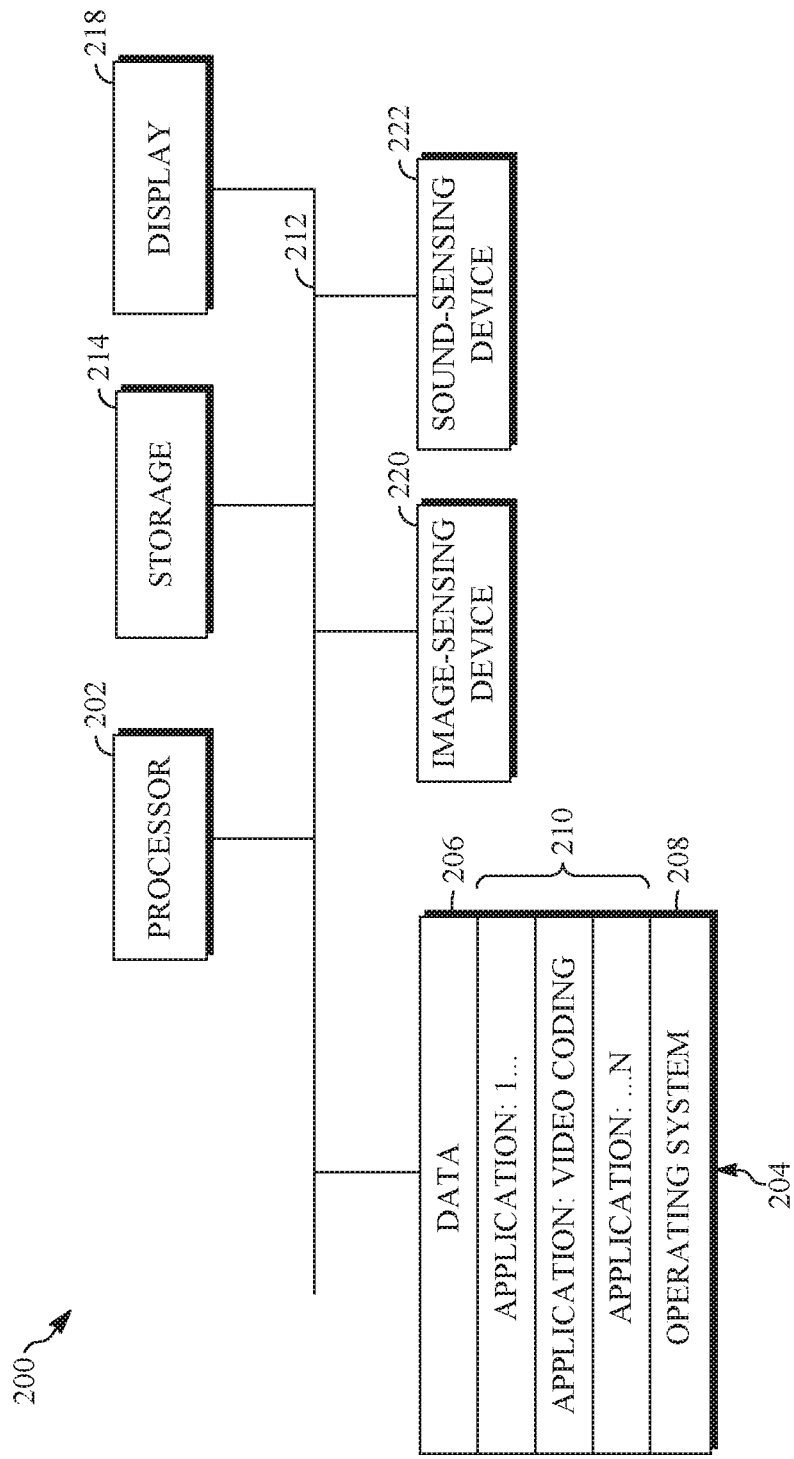
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
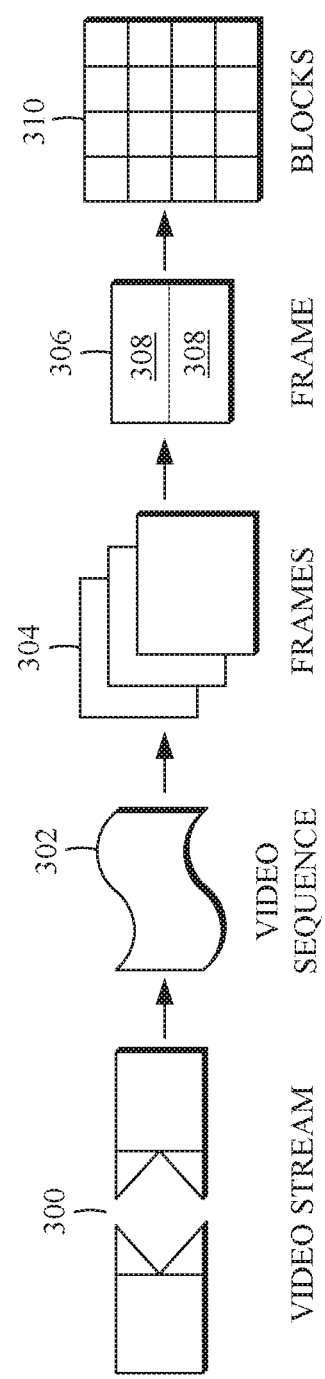
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
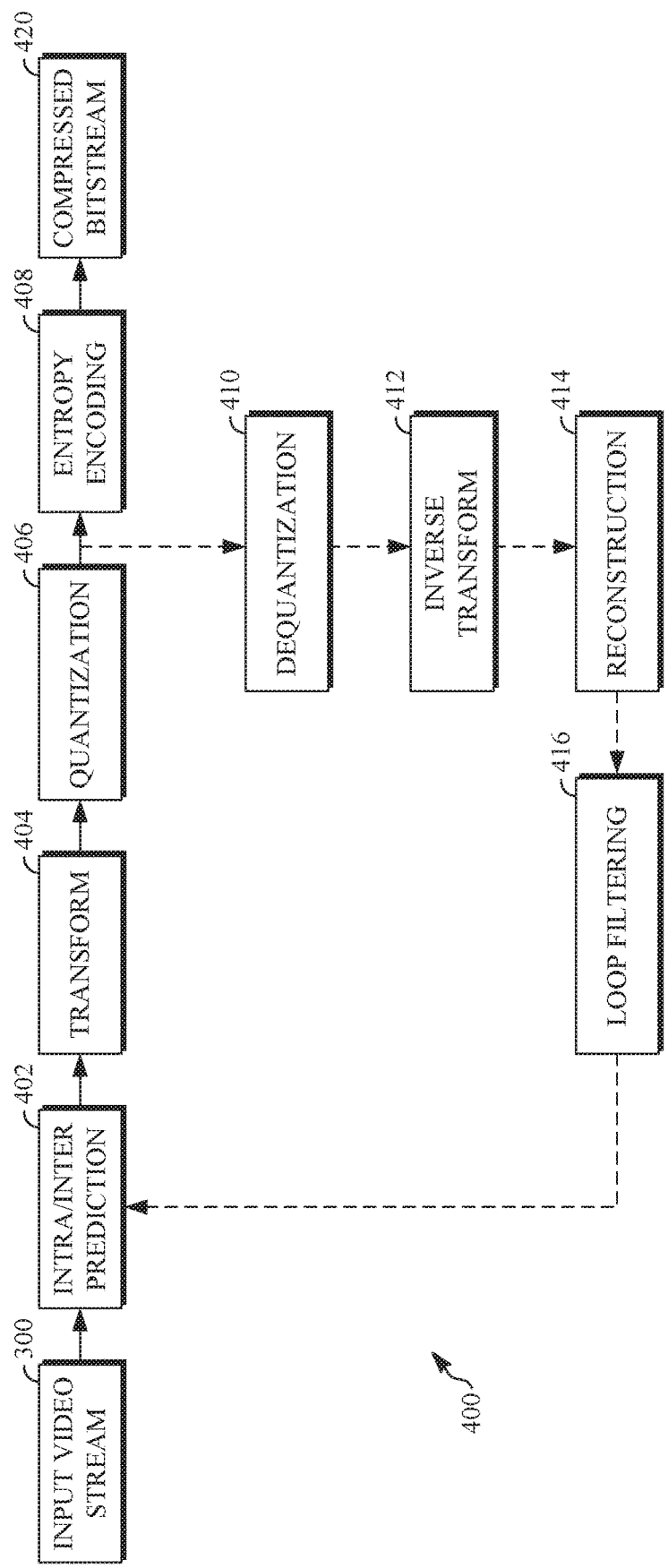
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. The designation of reference frames for groups of blocks is discussed in further detail below.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
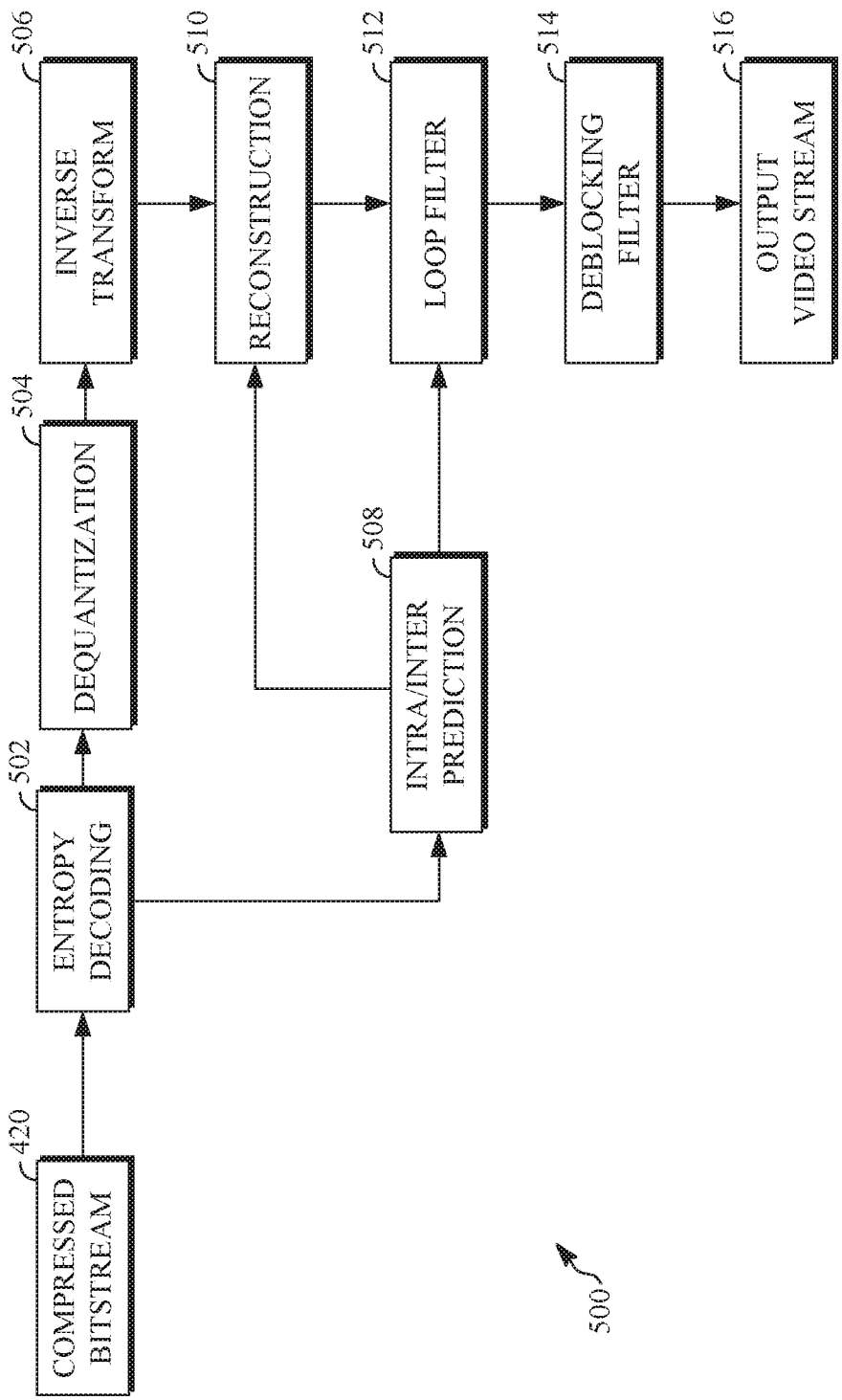
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
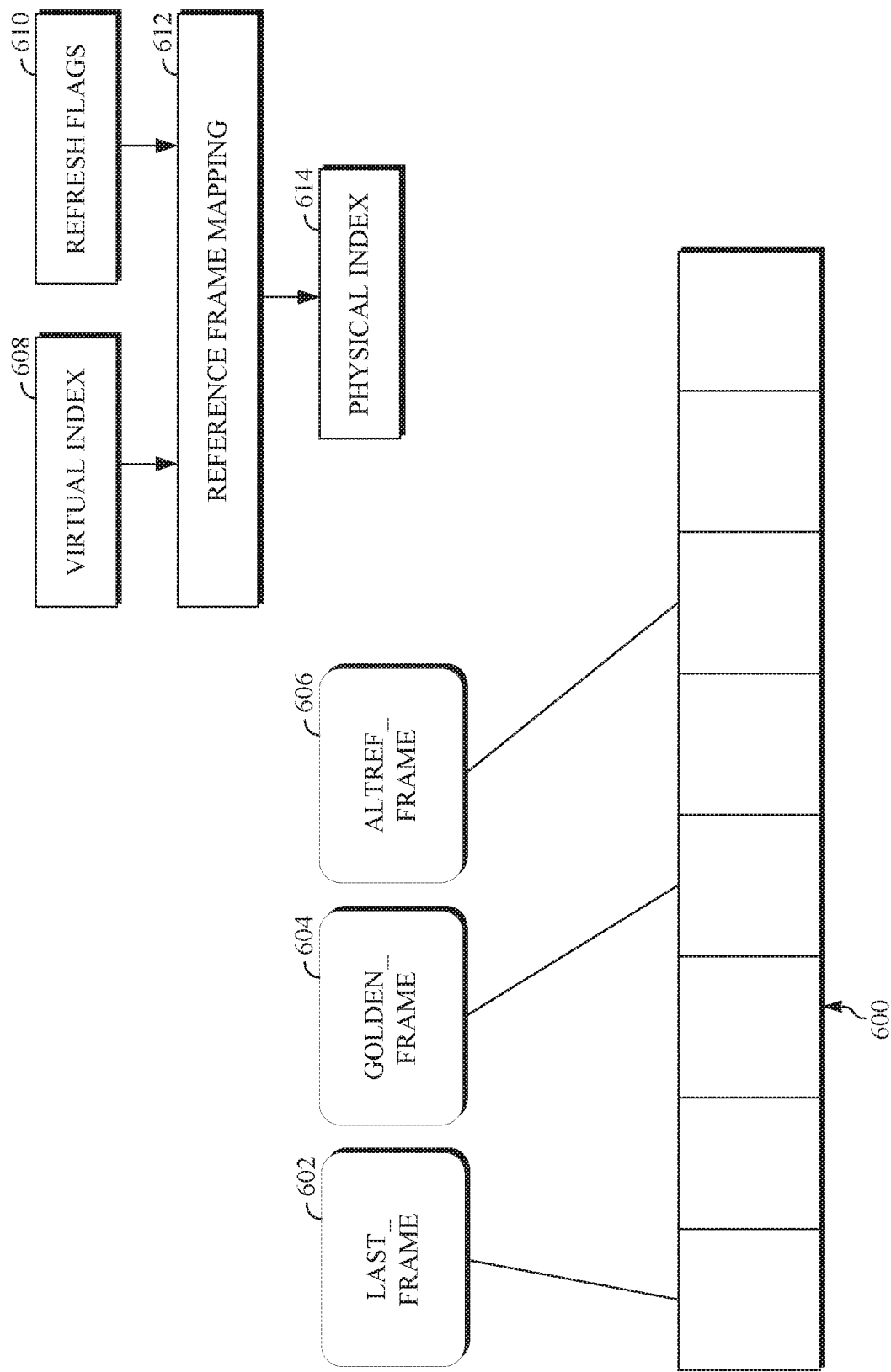
FIG. 6 is a block diagram of an example of a reference frame buffer.

FIG. 6 is a block diagram of an example of a reference frame buffer 600. The reference frame buffer 600 stores reference frames used to encode or decode blocks of frames of a video sequence. In this example, the reference frame buffer 600 includes reference frames identified as a last frame LAST_FRAME 602, a golden frame GOLDEN_FRAME 604, and an alternative reference frame ALTREF_FRAME 606. The frame header of a reference frame includes a virtual index 608 to a location within the reference frame buffer 600 at which the reference frame is stored. A reference frame mapping 612 maps the virtual index 608 of a reference frame to a physical index 614 of memory at which the reference frame is stored. Where two reference frames are the same frame, those reference frames will have the same physical index even if they have different virtual indexes. One or more refresh flags 610 can be used to remove one or more of the stored reference frames from the reference frame buffer 600, for example, to clear space in the reference frame buffer 600 for new reference frames, where there are no further blocks to encode or decode using the stored reference frames, or where a new frame is encoded or decoded and identified as a reference frame. The number of reference positions within the reference frame buffer 600, the types, and the names used are examples only.

The reference frames stored in the reference frame buffer 600 can be used to identify motion vectors for predicting blocks of frames to be encoded or decoded. Different reference frames may be used depending on the type of prediction used to predict a current block of a current frame. For example, in bi-prediction, blocks of the current frame can be forward predicted using either frames stored as the LAST_FRAME 602 or the GOLDEN_FRAME 604, and backward predicted using a frame stored as the ALTREF_FRAME 606.

There may be a finite number of reference frames that can be stored within the reference frame buffer 600. As shown in FIG. 6, the reference frame buffer 600 can store up to eight reference frames, wherein each stored reference frame may be associated with a different virtual index 602 of the reference frame buffer. Although three of the eight spaces in the reference frame buffer 600 are used by frames designated as the LAST_FRAME 602, the GOLDEN_FRAME 604, and the ALTREF_FRAME 606, five spaces remain available to store other reference frames. For example, one or more available spaces in the reference frame buffer 600 may be used to store further alternative reference frames.

In some implementations, the alternative reference frame designated as the ALTREF_FRAME 606 may be a frame of a video sequence that is distant from a current frame in a display order, but is encoded or decoded earlier than it is displayed. For example, the alternative reference frame may be ten, twelve, or more (or fewer) frames after the current frame in a display order. Further alternative reference frames can be frames located nearer to the current frame in the display order. Being closer to the current frame in display order increases the likelihood of the features of a reference frame being more similar to those of the current frame. As such, one or more alternative reference frames can be stored in the reference frame buffer 600 as additional option(s) usable for backward prediction.

An alternative reference frame may not correspond directly to a frame in the sequence. Instead, the alternative reference frame may be generated using one or more of the frames having filtering applied, being combined together, or being both combined together and filtered. An alternative reference frame may not be displayed. Instead, it can be a frame or portion of a frame generated and transmitted for use only for prediction (i.e., it is omitted when the decoded sequence is displayed).

Although the reference frame buffer 600 is shown as being able to store up to eight reference frames, other implementations of the reference frame buffer 600 may be able to store additional or fewer reference frames. Furthermore, the available spaces in the reference frame buffer 600 may be used to store frames other than alternative reference frames. For example, the available spaces may store a second last frame (i.e., the first frame before the last frame) and/or a third last frame (i.e., a frame two frame before the last frame) as additional forward prediction reference frames. In some examples, a backward frame may be stored as an additional backward prediction reference frame.

Figure 7:
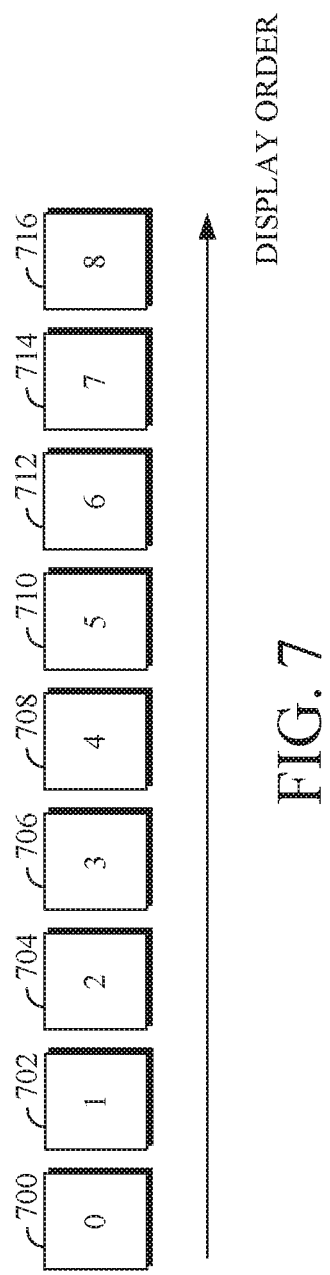
FIG. 7 is a diagram of a group of frames in a display order of the video sequence.

FIG. 7 is a diagram of a group of frames in a display order of the video sequence. In this example, the group of frames is preceded by a frame 700, which can be referred to as a key frame or an overlay frame in some cases, and comprises eight frames 702-716. No block within the frame 700 is inter predicted using reference frames of the group of frames. The frame 700 is a key (also referred to as intra-predicted frame) in this example, which refers to its status that predicted blocks within the frame are only predicted using intra prediction. However, the frame 700 can be an overlay frame, which is an inter-predicted frame that can be a reconstructed frame of a previous group of frames. In an inter-predicted frame, at least some of the predicted blocks are predicted using inter prediction. The number of frames forming each group of frames can vary according to the video spatial/temporal characteristics and other encoded configurations, such as the key frame interval selected for random access or error resilience, for example. The number of frames forming each group may be determined by a first pass of a two-pass encoder, such as the encoder 400. In the first pass, statistics regarding the frames to be encoded are gathered and used for further processing in the second pass. The statistics can include the level of motion across frames of the video sequence, the frame rate, the frame resolution, etc. For example, the less motion across a sequence, the larger the number of frames within a group of frames may exist.

Regardless of how the group of frames is formed, or how many frames form the group, there is only one display order of the video sequence. In FIG. 7, the number (e.g., 1-8) on the frames 702-716 indicates the position of the frame in the video sequence. The frame 700 is numbered 0 to reflect that it precedes the group of frames. The frame 700 may, in some cases, be referred to as part of the group of frames for convenience, but the position of the frame 700 does not change in reversed ordering regardless of whether or not it is described as a frame of the group of frames.

The coding order for each group of frames can differ from the display order. As mentioned briefly above, this allows a frame located after a current frame in the video sequence to be used as a reference frame for encoding the current frame. A decoder, such as the decoder 500, may share a common group coding structure with an encoder, such as the encoder 400. The group coding structure assigns different roles that respective frames within the group may play in the reference buff (e.g., a last frame, an alternative reference frame, etc.) and defines or indicates the coding order for the frames within a group.

Figure 8:
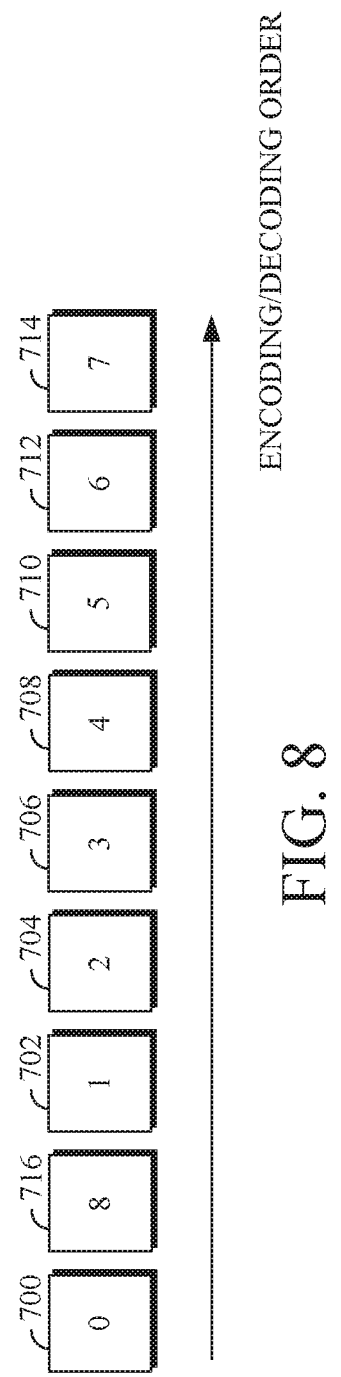
FIG. 8 is a diagram of a first example of a coding order for the group of frames of FIG. 7.

FIG. 8 is a diagram of a first example of a coding order for the group of frames of FIG. 7. The coding order of FIG. 8 is associated with a first group coding structure whereby a single backward reference frame is available for each frame of the group. Because the encoding and decoding order is the same, the order shown in FIG. 8 is generally referred to herein as a coding order. The key or overlay frame 700 is designated the golden frame in a reference frame buffer, such as the GOLDEN_FRAME 604 in the reference frame buffer 600. The frame 700 is intra-predicted in this example, so it does not require a reference frame, but an overlay frame as the frame 700, being a reconstructed frame from a previous group, also does not use a reference frame of the current group of frames. The final frame 716 in the group is designated an alternative reference frame in a reference frame buffer, such as the ALTREF_FRAME 606 in the reference frame buffer 600. In this coding order, the frame 716 is coded out of the display order after the frame 700 so as to provide a backward reference frame for each of the remaining frames 702-714. In coding blocks of the frame 716, the frame 700 serves as an available reference frame for blocks of the frame 716.

In coding blocks of each of the frames 702-714, the frame 700 (as the golden frame) is available as a forward prediction frame and the frame 716 (as the alternative reference frame) is available as a backward reference frame. Further, the reference frame buffer, such as the reference frame buffer 600, is updated after encoding each frame so as to update the identification of the reference frame, also called a last frame, which is available as a forward prediction frame in a similar manner as the frame 700. For example, when blocks of the frame 702 are being predicted (e.g., at the intra/inter prediction stage 402), the frame 716 (or, in some cases, the frame 700) is also designated the last frame, such as the LAST_FRAME 602 in the reference frame buffer 600. When blocks of the frame 704 are being predicted, the frame 702 is designated the last frame, replacing the frame 716 or 700 as the last frame in the reference frame buffer. Similarly, when blocks of the frame 706 are being predicted, the frame 704 is designated the last frame, replacing the frame 702 as the last frame in the reference frame buffer. This process continues for the prediction of the remaining frames 708-714 of the group in the encoding order. In this way, a single backward reference frame is available for inter-prediction of blocks of the frames 702-714.

Figure 9:
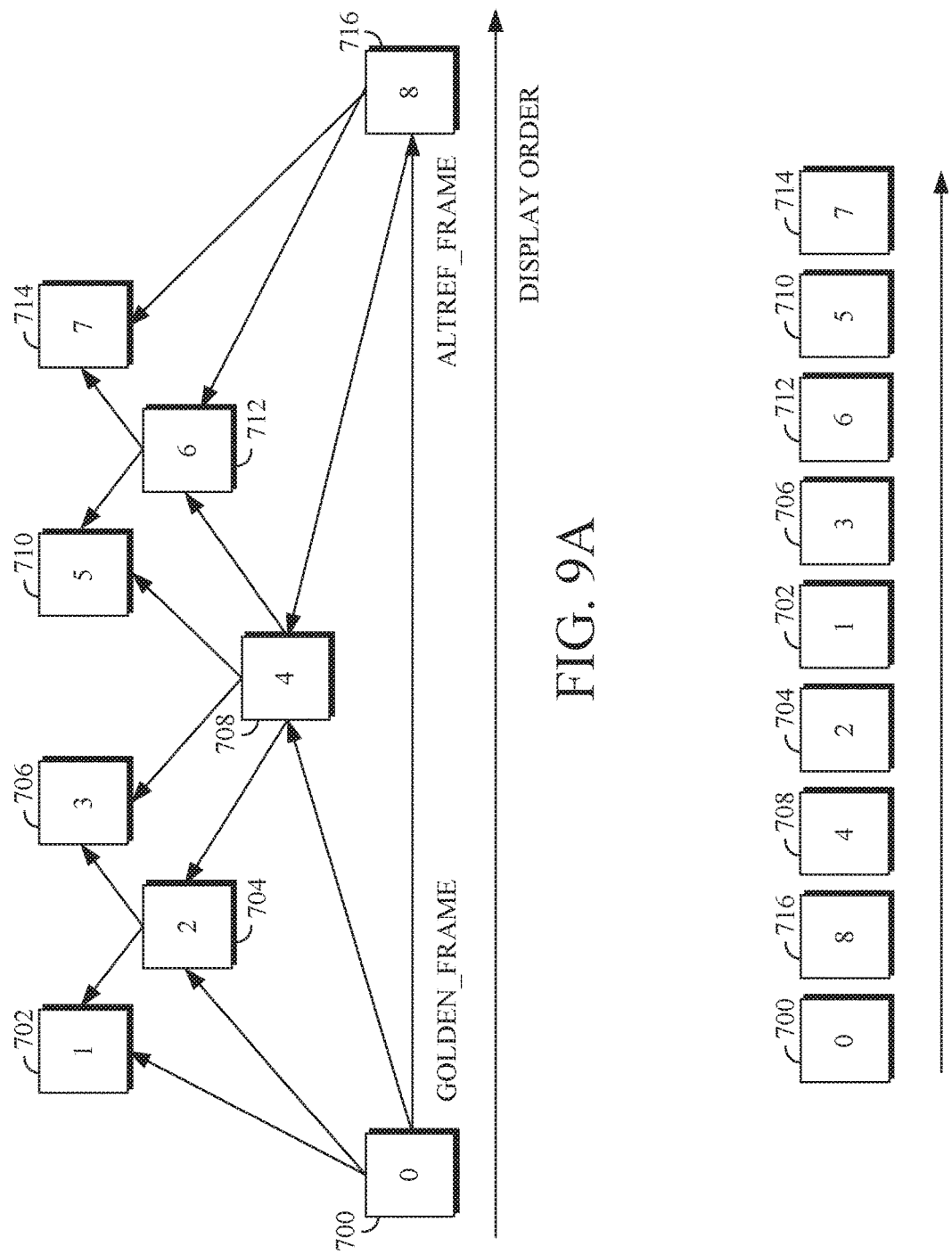
FIG. 9A is a diagram of a hierarchical multi-layer structure illustrating the available reference frames in a second example of a coding order for the group of frames of FIG. 7.
FIG. 9B is a diagram of the second example of the coding order for the group of frames of FIG. 7 according to the layers of FIG. 9A.

FIG. 9A is a diagram of a hierarchical multi-layer structure illustrating the available reference frames in a second example of a coding order for the group of frames of FIG. 7, while FIG. 9B is a diagram of the second example of the coding order for the group of frames of FIG. 7 according to the layers of FIG. 9A. The layers of FIG. 9A show the frames 700-716 in the display order of the video sequence.

As explained above, the frames shown in FIG. 7A represent a subset or group of frames preceded by a frame 700 in the display order that corresponds to a key frame or previous overlay frame (e.g., the GOLDEN_FRAME 604) for the group, and a last frame 716 in the display order corresponds to an alternative reference frame (e.g., the ALTREF_FRAME 606). The frame 716 is far enough away from the frame 700 in the display order to have different features but not so different that the two cannot both be used as reference frames for another frame of the group. In this example, the group comprises eight frames (excluding the frame 700), but a group can have a cardinality of 4 to 16 in some implementations. Selecting the frame farthest from the frame 700 as the alternative reference frame for the group increases the difficulty in identifying similarities between features between those frames unless the video sequence has relatively static motion. However, because the frame 716 is used as a backward prediction frame, selecting a frame that is closer than to the frame 700 limits the number of frames for which the frame 716 can be a reference frame.

As alluded to previously, however, additional reference frames can be used to increase coding efficiency. One example to obtain additional reference frames is to designate a frame closer to the golden frame, e.g., the frame 700, as an alternative reference frame. Providing additional reference frames can be achieved by organizing the frames within a group to be encoded or decoded into layers in a display order. The layers of FIG. 9A represent a group coding structure having multiple backward reference frames in contrast to the group coding structure illustrated by FIG. 8. In FIG. 9A, the first layer includes the frame 700 (designated the golden frame) and the frame 716 (designated an alternative reference frame). The second layer includes the frame 708, and the third layer includes the frames 704 and 712. The fourth, and final, layer includes the frames 702, 706, 710, and 714.

The frame 708 is selected as the frame that is evenly (or approximately evenly) spaced apart between the frame 700 and the frame 716 in the display order. Similarly, the frame 704 and the frame 712 can be selected as frames evenly (or approximately evenly) spaced apart between the frame 700 and the frame 704, and between the frame 704 and the frame 716, respectively, in the display order. In the example shown, where the frame 700 and the frame 716 are spaced apart by seven frames, the frame 708 is spaced apart from each by three frames, the frame 704 is spaced apart from each of the frame 700 and the frame 708 by one frame, and the frame 712 is spaced apart from each of the frame 708 and the frame 716 by one frame.

The frame 700 is the first frame encoded or decoded, followed by the first alternative reference frame, frame 716, and then another alternative reference frame, frame 708. The encoding or decoding order of the frames follows the hierarchy of layers shown in FIG. 9A. For example, the first two frames 700, 716 correspond to the first layer. The third frame in the coding order, the frame 708, corresponds to the second layer. There are two frames in the third layer, and no layers after the fourth layer. Hence, the fourth frame in the coding order, the frame 704, corresponds to the first frame in the display order in the third layer, which is followed by the fifth and sixth frames corresponding to the fourth layer, here the frames 702, 706. Then, the seventh frame in the coding order corresponds to the second frame in the display order in the third layer, the frame 712, which is followed by the final two frames 710, 714 corresponding to the fourth layer as the eighth and ninth frames.

As can be seen from FIG. 9B, the group coding structure of FIG. 9A, like that described with regard to FIG. 8, results in a frame being encoded out of order only when it can be used as a backward reference frame. In this arrangement, the arrows in FIG. 9A show, in part, the roles assigned to frames within a reference frame buffer such as the reference frame buffer 600. As with the first group coding structure, the frame 700 is designated a golden or key reference that is available as a forward prediction frame for blocks of the frames 702-716, and the frame 716 is designated as a first alternative reference frame available as a backward prediction frame for the blocks of each of the frames 702-714. The frame 708 is designated as a second alternative reference frame available as a backward prediction frame for the blocks of at least frames 704, 712. The frames 704 and 712 can be designated as additional backward or alternative reference frames for prediction of the blocks of at least frames 702, 706 and frames 710, 714, respectively. The frame 712 can replace the frame 704 in the reference frame buffer as a backward or alternative reference frame in some implementations as the frames are encoded and decoded.

Finally, the last reference frame within a reference frame buffer is updated as the video frames are encoded and decoded to serve as another forward prediction frame for blocks of the following frame in the coding order. For example, the key or golden frame 700 is designated the last reference frame available as a forward reference frame for the frame 716, the frame 716 is designated the last reference frame available as a forward reference frame for the frame 708, the frame 708 is designated the last reference frame available as a forward reference frame for the frame 704, the frame 704 is designated the last reference frame available as a forward reference frame for the frame 702, the frame 702 is designated the last reference frame available as a forward reference frame for the frame 706, the frame 706 is designated the last reference frame available as a forward reference frame for the frame 712, the frame 712 is designated the last reference frame available as a forward reference frame for the frame 710, and the frame 710 is designated the last reference frame available as a forward reference frame for the frame 714.

The frames 702, 706, 710, and 714 are not used as backward reference frames. Accordingly, and like the first group coding structure, the second group structure results in a frame of a group of frames being coded out of order only when it is available for use as a backward reference frame. A frame may be said to be coded out of order when its position in the coding order of a group of frame is before its preceding, adjacent frame in the display or reversed display order, whichever is applicable.

Figures 10, 11:
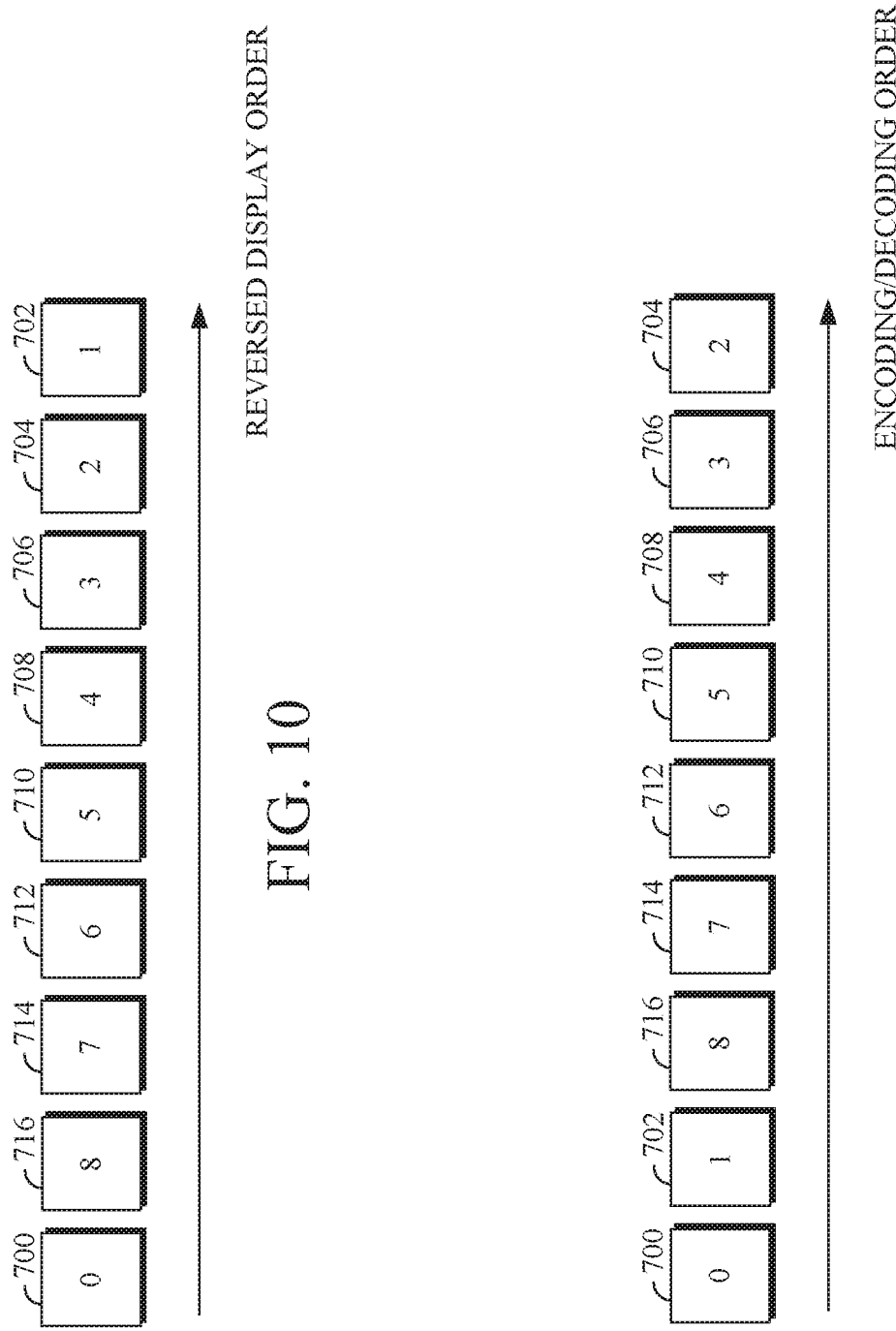
FIG. 10 is a diagram of the group of frames of FIG. 7 in a reversed display order of the video sequence.
FIG. 11 is a diagram of a first example of a coding order for the group of frames of FIG. 10.

FIG. 10 is a diagram of the group of frames of FIG. 7 in a reversed display order of the video sequence. As mentioned above, the group of frames is preceded by the frame 700, and comprises the frames 702-716. The position of the frame 700 does not change in reversed ordering, i.e., the reversed display order. However, the frames of the group are arranged in reversed display order so that the final frame 716 in the display order is the first frame following the frame 700 in the reversed display order and the first frame 702 in the display order is the final frame following the frame 700 in the reversed display order.

FIG. 11 is a diagram of a first example of a coding order for the group of frames of FIG. 10. The coding (e.g., encoding or decoding) order of FIG. 11 is associated with the first group coding structure described with regard to FIG. 8, whereby a single backward reference frame is available for each frame of the group. 14. Stated generally, where the group of frames comprises, in the display order, a first frame preceded by a key (e.g., intra-predicted) or overlay frame, a last frame, and at least two intervening frames between the first frame and the last frame, the coding order with a single backward reference frame can include the first frame preceded by the key or overlay frame, followed by the last frame, and the at least two intervening frames following the last frame in the reversed display order.

In applying the first group coding structure to the group of frames shown in FIG. 10, the key or overlay frame 700 is designated the golden frame in a reference frame buffer, such as the GOLDEN_FRAME 604 in the reference frame buffer 600. The final frame 702 in the group is designated an alternative reference frame in a reference frame buffer, such as the ALTREF_FRAME 606 in the reference frame buffer 600. In this coding order, the frame 702 is coded out of the reversed display order after the frame 700 so as to provide a backward reference frame for each of the remaining frames 716-704. In coding blocks of the frame 702, the frame 700 serves as an available reference frame for blocks of the frame 702.

In coding blocks of each of the frames 716-704, the frame 700 (as the golden frame) is available as a forward prediction frame and the frame 702 (as the alternative reference frame) is available as a backward reference frame. Further, the reference frame buffer, such as the reference frame buffer 600, is updated after encoding and subsequently decoding each frame so as to update the identification of the reference frame, also called a last frame or last reference frame, which is available as a forward prediction frame in a similar manner as the frame 700. For example, when blocks of the frame 716 are being predicted (e.g., at the intra/inter prediction stage 402), the frame 702 (or, in some cases, the frame 700) is also designated the last frame, such as the LAST_FRAME 602 in the reference frame buffer 600. When blocks of the frame 714 are being predicted, the frame 716 is designated the last frame, replacing the frame 702 or 700 as the last frame in the reference frame buffer. Similarly, when blocks of the frame 712 are being predicted, the frame 714 is designated the last frame, replacing the frame 716 as the last frame in the reference frame buffer. This process continues for the prediction of the remaining frames 710-704 of the group in the encoding order. In this way, a single backward reference frame is available for inter-prediction of blocks of the frames 716-704.

Figures 12A, 12B:
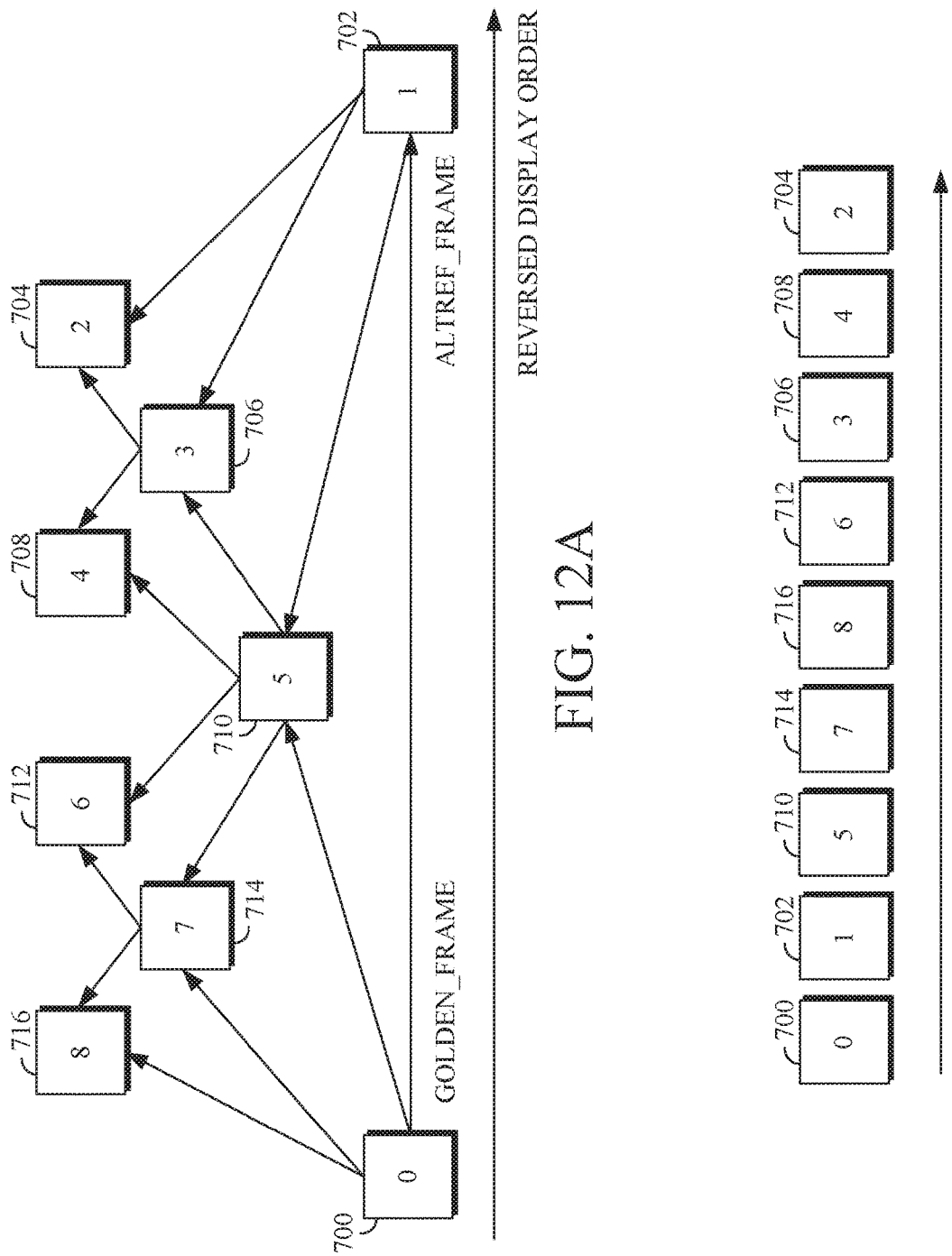
FIG. 12A is a diagram of the hierarchical multi-layer structure illustrating the available reference frames in the second example of a coding order for the group of frames of FIG. 10.
FIG. 12B is a diagram of the second example of the coding order for the group of frames of FIG. 10 according to the layers of FIG. 12A.

FIG. 12A is a diagram of the hierarchical multi-layer structure illustrating the available reference frames in the second example of a coding order for the group of frames of FIG. 10. FIG. 12B is a diagram of the second example of the coding order for the group of frames of FIG. 10 according to the layers of FIG. 12A. The layers of FIG. 12A show the frames 700-716 in the reversed display order of the video sequence.

A group coding structure that provides multiple backward reference frames applied to a group of frames in a reversed display order where the group includes, in the display order, a first frame preceded by a key or overlay frame, a last frame, and at least two intervening frames (i.e., at least a first intervening frame and a second intervening frame) between the first frame and the last frame, can result in a coding order where the first frame is preceded by the key or overlay frame, which is followed by the second intervening frame of the at least two intervening frames, the last frame, and the first intervening frame of the at least two intervening frames. This results in at least two frames encoded out of order for use as candidate reference frames for backward inter prediction.

The layers of FIG. 12A represent the group coding structure described in FIG. 9A applied to the group of frames shown in FIG. 10. This group coding structure provides multiple backward reference frames, and is only one example of the possible implementations of layers. The first layer includes the frame 700 (designated the golden frame) and the frame 702 (designated an alternative reference frame). The second layer includes the frame 710, and the third layer includes the frames 714 and 706. The fourth, and final, layer includes the frames 716, 712, 708, and 704.

The frame 710 is selected as the frame that is evenly (or approximately evenly) spaced apart between the frame 700 and the frame 702 in the reversed display order. Similarly, the frame 714 and the frame 706 can be selected as frames evenly (or approximately evenly) spaced apart between the frame 700 and the frame 710, and between the frame 710 and the frame 702, respectively, in the reversed display order. In the example shown, where the frame 700 and the frame 702 are spaced apart by seven frames, the frame 710 is spaced apart from each by three frames, the frame 714 is spaced apart from each of the frame 700 and the frame 710 by one frame, and the frame 706 is spaced apart from each of the frame 710 and the frame 702 by one frame.

The frame 700 is the first frame encoded or decoded, followed by the first alternative reference frame, frame 702, and then another alternative reference frame, frame 710. The encoding or decoding order of the frames follows the hierarchy of layers shown in FIG. 12A. For example, the first two frames 700, 702 correspond to the first layer. The third frame in the coding order, the frame 710, corresponds to the second layer. There are two frames in the third layer, and no layers after the fourth layer. Hence, the fourth frame in the coding order, the frame 714, corresponds to the first frame in the reversed display order in the third layer, which is followed by the fifth and sixth frames corresponding to the fourth layer, here the frames 716, 712. Then, the seventh frame in the coding order corresponds to the second frame in the reversed display order in the third layer, the frame 706, which is followed by the final two frames 708, 704 corresponding to the fourth layer as the eighth and ninth frames.

As in FIG. 9A, the arrows in FIG. 12A show, in part, the roles assigned to frames within a reference frame buffer such as the reference frame buffer 600. As with the first group coding structure, the frame 700 is designated a golden or key reference that is available as a forward prediction frame for blocks of the frames 716-702, and the frame 702 is designated as a first alternative reference frame available as a backward prediction frame for the blocks of each of the frames 716-704. The frame 710 is designated as a second alternative reference frame available as a backward prediction frame for the blocks of at least frames 714, 706. The frames 714 and 706 can be designated as additional backward or alternative reference frames for prediction of the blocks of at least frames 716, 712 and frames 708, 704, respectively. The frame 706 can replace the frame 714 in the reference frame buffer as a backward or alternative reference frame in some implementations as the frames are encoded and decoded. The frames 716, 712, 708, and 704 are not used as backward reference frames.

Finally, the last reference frame within a reference frame buffer is updated as the video frames are encoded and decoded to serve as another forward prediction frame for blocks of the following frame in the coding order. For example, the key or golden frame 700 is designated the last reference frame available as a forward reference frame for the frame 702, the frame 702 is designated the last reference frame available as a forward reference frame for the frame 710, the frame 710 is designated the last reference frame available as a forward reference frame for the frame 714, the frame 714 is designated the last reference frame available as a forward reference frame for the frame 716, the frame 716 is designated the last reference frame available as a forward reference frame for the frame 712, the frame 712 is designated the last reference frame available as a forward reference frame for the frame 706, the frame 706 is designated the last reference frame available as a forward reference frame for the frame 708, and the frame 708 is designated the last reference frame available as a forward reference frame for the frame 704.

As can be seen from FIGS. 7-12B, the set of reference frames available to predict for encoding or decoding frames of a group of frames differs when the frames are arranged in the display order as compared to the reversed display order. A video sequence can be divided into successive groups of frames. In general, the groups are formed so that the member frames contain relatively consistent characteristics different from those of adjacent groups. For example, one group may exhibit stillness across its successive frames, while another exhibits a panning motion. Other examples are possible.

Due to the differences between the motion and/or other characteristics within the groups, candidate reference frames selected from a group of frames arranged in the reversed display order using a group coding structure can result in improved coding performance (e.g., a reduced rate-distortion error) as compared to candidate reference frames selected from the group of frames arranged in the display order using the same group coding structure (or a different coding structure). Each of the groups may be supplied to a prediction process of an encoder in either the display order or the reversed display order, where the prediction process performed of the encoder, such as at the intra/inter prediction stage 402 of the encoder 400, arranges the group in a coding order and predicts the frames.

Figure 13:
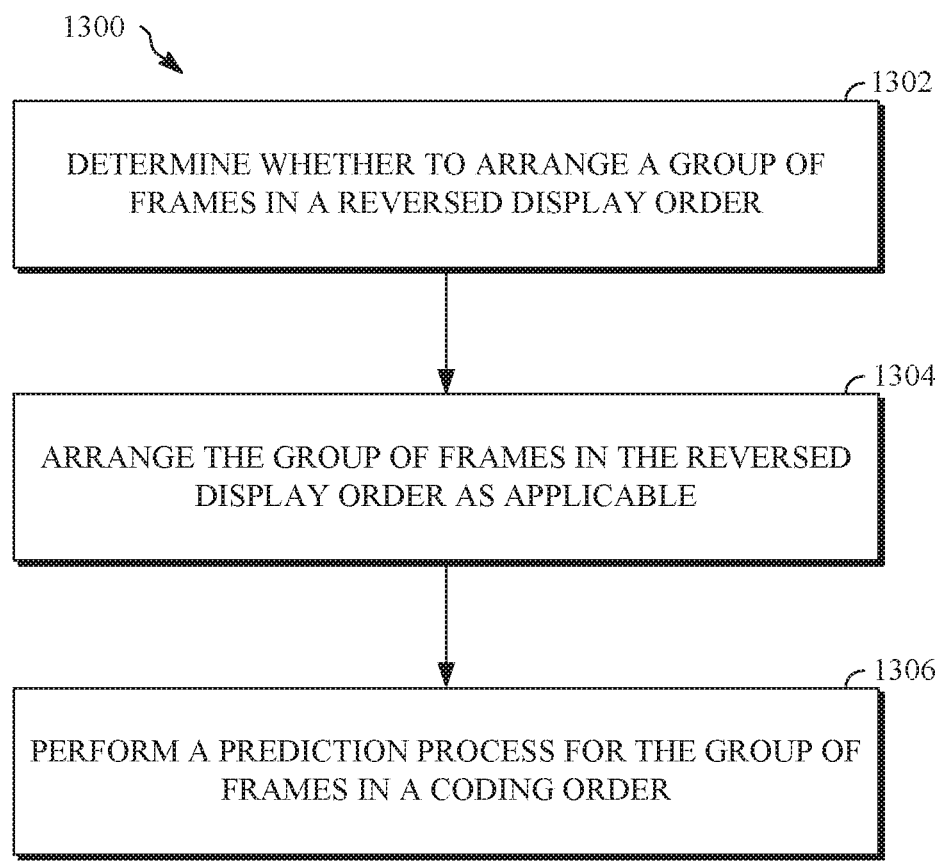
FIG. 13 is a flowchart diagram of a process for encoding video frames using reversed ordering.

FIG. 13 is a flowchart diagram of a method or process 1300 for encoding video frames using reversed ordering, also referred to as reversed display order. The process 1300 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 1300. The process 1300 can be implemented using specialized hardware or firmware. Some computing devices may have multiple memories or processors, and the operations described in the process 1300 can be distributed using multiple processors, memories, or both.

At 1302, whether to arrange a group of frames in a reversed display order is determined. This determination may be made before a prediction process of an encoder for the group of frames. The group of frames is formed of a proper subset of frames of a video sequence having a display order.

The encoder may employ different schemes to determine whether the group should use the display order or the reversed display order to obtain a good tradeoff between the encoding performance and the encoder complexity. In an example, the encoder may conduct a rate-distortion analysis to compare the rate-distortion performance between the use of the normal display order and the reversed display order. A rate-distortion analysis can calculate the rate (e.g., the number of bits) used to encode frames of the group as compared to the distortion resulting from the encoding. The distortion may be calculated as the differences between pixel values of the frame before encoding and after decoding. The differences can be a sum of absolute differences or some other measure that captures the accumulated error for blocks of the frames.

In this example, determining whether to arrange the group of frames in the reversed display order may include performing a first rate-distortion analysis of encoding the group of frames arranged in the display order, performing a second rate-distortion analysis of encoding the group of frames arranged in the reversed display order, and making a determination to arrange the group of frames in the reversed display order responsive to an error of the second rate-distortion analysis being lower than an error of the first rate-distortion analysis. The error may be the ratio of the rate to the distortion, or another error value. The first rate-distortion analysis and the second rate-distortion analysis do not have to be performed with optimization. That is, not all possible prediction modes, transform modes, group coding structures, etc., need be included in the analysis for the group of frames in each of the display order and the reversed display order. Desirably, the same encoding parameters and modes are used to make the comparison.

Another scheme to determine whether the group should use the display order or the reversed display order may extract spatial and/or temporal features from the group of frames through a simpler coding procedure compared to a rate-distortion analysis. For example, where a two-pass encoder is used to encode frames, video features of the frames of the group, such as motion information obtained through a motion analysis, may be collected during a first pass that may then be used in making the determination. The motion analysis may be performed by inter-predicting at least some of the frames of the group arranged in the display order using a single forward reference frame, and making the determination to arrange the group of frames in the reversed display order responsive to the motion analysis indicating a defined motion across the group of frames. In an implementation, the single reference frame may be the golden frame (i.e., the frame preceding the group of frames). The defined motion may be, for example, a zoom in or a zoom out. That is, detection of a zoom in or a zoom out across the group of frames may result in arranging the group of frames in the reversed display order. In other examples, the video features may be used in schemes such as lookup tables that map certain features to whichever of the display order or the reversed display order is likely to produce a better set of reference frames for the group.

At 1304, the group of frames is arranged in the reversed display order, as applicable, before the prediction process. For example, arranging the group of frames in the reversed display order may occur responsive to a determination to arrange the group of frames in the reversed display order before the prediction process for the group of frames. For example, where the group of frames comprises eight frames in the display order, such as shown in FIG. 7, the reversed display order is as shown in FIG. 10.

Whether or not the group of frames is arranged in the display order or the reversed display order, the process 1300 advances to perform a prediction process for the group of frames in a coding order at 1306. The display order or the reversed display order, whichever is applicable, may be referred to as an input order to the prediction process. Accordingly, performing the prediction process can include receiving the group of frames to the prediction process in the input order. The group of frames may be received at the intra/inter prediction stage 402 to perform the prediction process during the second pass of a two-pass encoding process, for example.

Performing the prediction process at 1306 can also include arranging the group of frames, received in the input order, in a coding order using a group coding structure that defines at least one backward reference frame for inclusion within a set of candidate reference frames. The group coding structure may correspond to the first group coding structure described with regard to FIGS. 8 and 11, or to another group coding structure that produces one backward reference frame. The group coding structure may correspond to the second group coding structure described with regard to FIGS. 9A, 9B, 12A, and 12B, or to another group coding structure that produces more than one backward reference frame for frames of the group. The set of candidate reference frames can include available reference frames for a respective frame in the group of frames stored within a reference frame buffer, such as the reference frame buffer 600. For example, in the coding order of FIG. 11, the set of candidate reference frames for the prediction process of the frame 710 comprises the golden frame (i.e., frame 700), the last frame (i.e., frame 712), and the alternative reference frame (i.e., frame 702). Similarly, the set of candidate reference frames for the prediction process of the frame 716 comprises the golden frame (i.e., frame 700), the last frame (i.e., frame 702), and the alternative reference frame (i.e., frame 702).

The group coding structure may be selected by performing a rate-distortion analysis that compares encoding the group of frames in a coding order defined by each of a set of available group coding structures, and selects the group coding structure that results in the coding order having most efficient coding (e.g., the lowest rate-distortion error). Regardless of how the group coding structure (and hence the coding order) is selected, the encoder can transmit information within the encoded bitstream that indicates the selected group coding structure to the decoder. Alternatively, the process 1300 may use a group coding structure that is agreed to between the encoder and a decoder a priori. As mentioned above, the group coding structure assigns roles to the frames within the reference frame buffer for the prediction process. That is, the set of candidate reference frames is determined by the group coding structure.

Performing the prediction process at 1306 can also include predicting the group of frames in the coding order using the set of candidate reference frames. Predicting the group of frames can include predicting blocks of each frame. Predicting the group of frames can include selecting at least one reference frame of the set of candidate reference frames to use for predicting a current block of a current frame within the group of frames, and generating a prediction block using the selected reference frame. The current block is encodable using the prediction block.

In order to select one or more reference frames for predicting a current block of a frame, each reference frame of the set of candidate reference frames may be used to generate a prediction block for the current block. Where bi-directional prediction is allowed, one or more combinations of forward and backward prediction frames may also be used to generate respective prediction blocks. One or more intra-prediction modes may also be used to generate respective prediction blocks for the current block. The prediction block that is the best predictor for the current block determines the prediction mode for the block. The best predictor may be selected by determining which of the prediction blocks has pixel values most similar to the current block being predicted. This may be calculated using a sum of absolute differences or other measure of the differences between the pixel values of the prediction block and the current block. The prediction block can encode the current block by compressing the residual, for example using the compression described with regard to the encoder 400 (e.g., the transform stage 404, the quantization stage 406, and the entropy encoding stage 408. The process 1300 may include the further encoding steps for the group of frames.

The process 1300 may include transmitting a bit with the group of frames in the bitstream, such as the compressed bitstream 420, indicating whether the input order for the group supplied to the prediction process is the reversed display order. For example, a bit having a value of 1 may indicate the input order is the reversed display order, while a bit having a value of 0 may indicate the input order is the display order.

The video sequence may be formed of multiple groups of frames, where each of the multiple groups of frames is formed of a disjoint set of the frames of the video sequence. Hence, the process 1300 may be repeated for each of the multiple groups of frames. The multiple groups of frames may be encoded sequentially in the display order, while the frames within each group are encoded in their respective coding orders. For example, the frames of at least one of the multiple groups of frames are supplied to the prediction process in the reversed display order. The process 1300 can then further include transmitting, within an encoded bitstream including the multiple groups of frames, a bit with each group of the multiple groups of frames indicating respectively whether the input order for the group is the reversed display order.

In some cases, the process 1300 may be repeated in its entirety only for some of the multiple groups of frames. The process 1300 may be performed for a group depending on the number of frames in the group. For example, before prediction of a group of the multiple groups of frames, whether to arrange the frames of the group in the reversed display order may be determined only when a cardinality of the group is no more than eight. This may reduce the amount of computing time required to encode the multiple groups of the video sequence. The process 1300 may be performed for a group depending on latency of an encoder implementing the process 1300. For example, before prediction of a group of the multiple groups of frames, whether to arrange the frames of the group in the reversed display order may be determined only when latency of the encoder is less than a defined value. Generally, higher latency makes it less desirable to perform the process 1300 for a group. Latency may be measured in a variety of ways, such as the amount of time between arrival of a frame at the intra/inter prediction stage 402 and its inclusion in the compressed bitstream 420. Latency may also be measured by a count of frames. Thus, the defined value may be a measure of time or frames. An example of a defined value that may be used is one-half second. In this example, determining whether to arrange frames of a group in the reversed display order occurs only when latency of the encoder is less than one-half second. In this case, the process 1300 omits the determination at 1302 and the arranging at 1304, and proceeds directly to performing the prediction process at 1306 with the group in the display order.

Figure 14:
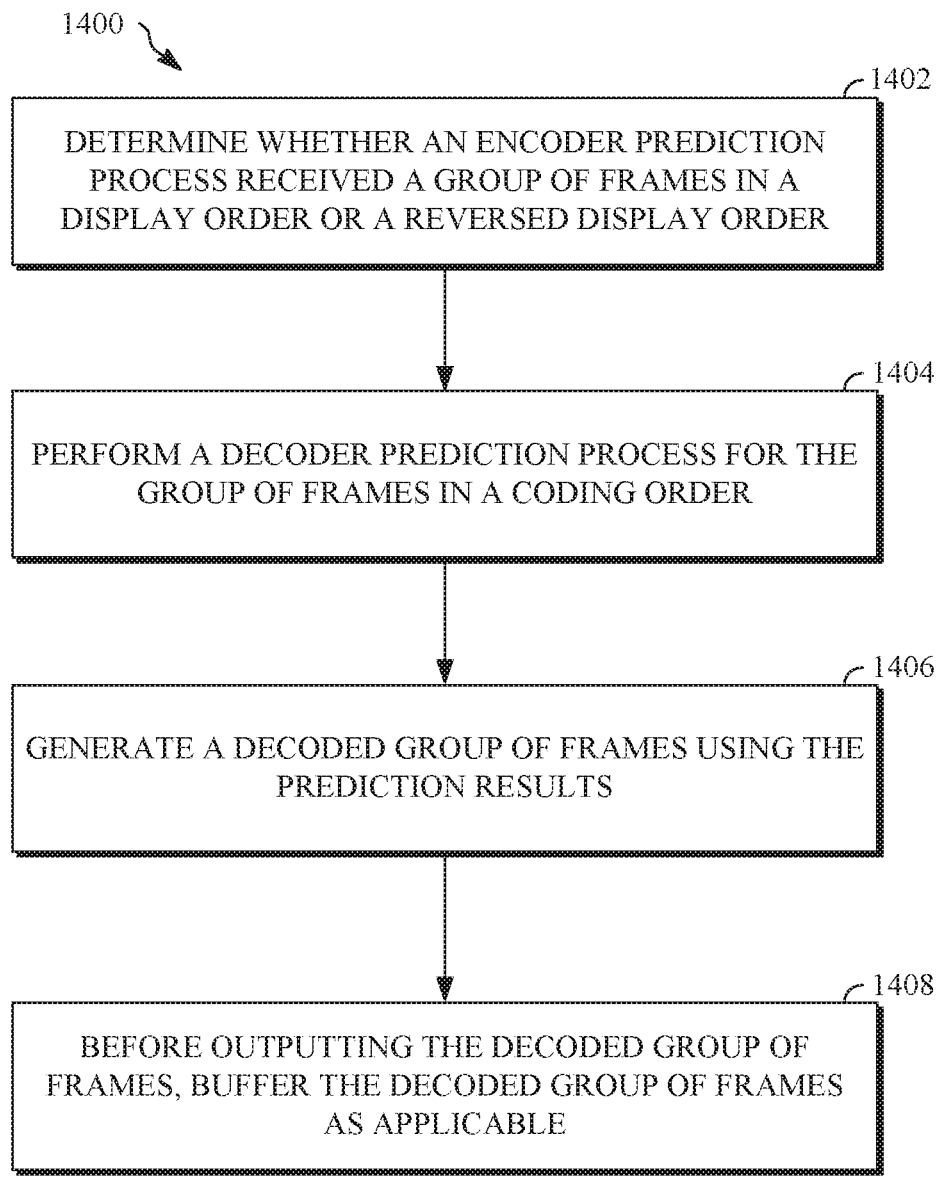
FIG. 14 is a flowchart diagram of a process for decoding video frames using reversed ordering.

FIG. 14 is a flowchart diagram of a method or process 1400 for decoding video frames using reversed ordering, also referred to as reversed display order. The process 1400 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 1300. The process 1300 can be implemented using specialized hardware or firmware. As described above, multiple processors, memories, or both, may be used.

At 1402, the process 1400 includes determining whether a prediction process of an encoder received a group of frames as input in one of a display order or a reversed display order. The group of frames is formed of a proper subset of frames of a video sequence having the display order.

The determination may be made using information from an encoded bitstream. In an example, determining whether the prediction process of the encoder received the group of frames as input in one of the display order or the reversed display order includes reading a bit encoded into the encoded bitstream with the encoded group of frames. For example, a determination that the prediction process of the encoder received the group of frames as input in the reversed display order may result responsive to the bit having a value of 1. The bit may be located in the header for the group of frames or in the header for the frame indicating the start of the group of frames.

At 1404, a prediction process of a decoder for the group of frames is performed. The group of frames is an encoded group of frames (e.g., residuals of blocks of the frames with information needed to decode the blocks) received from the encoded bitstream that is input to the prediction process. The frames in the group are received in a coding order. The coding order may be arranged using a group coding structure that defines at least one backward reference frame for inclusion within a set of candidate reference frames. As mentioned previously, the set of candidate reference frames are those associated with a reference frame buffer for a respective frame. The prediction process can also include predicting the group of frames in the coding order using the set of candidate reference frames. Predicting the group of frames can include predicting each frame using a respective set of candidate frames, such as in an intra/inter prediction stage 508. Each frame can be predicted in units of blocks, where some blocks are inter predicted and other blocks are intra predicted. In some cases, a block may be predicted using a combination of inter prediction and intra prediction.

Regardless of the prediction modes used, the prediction results of predicting the group of frames prediction process can be used to generate a decoded group of frames at 1406. For example, the prediction results can include predictors for respective blocks as described with regard to the intra/inter prediction stage 508. The predictors can then be combined with decoded residuals of the blocks to decode the group of blocks as described with regards to the dequantization stage 504, inverse transform stage 506, and reconstruction stage 510 of decoder 500. Additional filtering may also be performed.

Before outputting the decoded group of frames, some or all of the decoded group of frames may be buffered at 1408. For example, and responsive to a determination that the prediction process of the encoder received the group of frames as input in the reversed display order, the decoded group of frames is buffered and then the buffered decoded frames are output in the display order.

Buffering the decoded group of frames can include buffering each of the decoded group of frames until all of the frames of the decoded group of frames are generated so that the buffered decoded frames are output in the display order only after all of the frames of the decoded group of frames are buffered. This can be explained by reference to an example in FIG. 10. In the reversed display order, the frame 704 is the next to last frame, but the frame 704 is the second frame after the frame 700 in the display order. As a result, in many of the possible coding orders using the group of frames arranged in the reversed display order as input, the frame 704 is decoded late in the sequence. In the examples of FIGS. 11 and 12B, the frame 704 is decoded last. The frames decoded before the frame 704 are buffered until they can be output after the frame 704 is decoded in these examples.

Because the frames of the group were encoded in the coding order, they are also decoded in the coding order. The decoder knows the coding order through its knowledge of the group coding structure. Accordingly, the decoder can successfully identify the frames so as to output them in the display order.

When there is a determination that the prediction process of the encoder received the group of frames as input in the display order, the decoder outputs the decoded group of frames in the display order by either outputting the most recently decoded frame, or outputting a previous decoded frame stored in the reference frame buffer, depending upon the coding order.

The process ends after the group of frames is decoded. The video sequence comprises multiple groups of blocks, and each can be decoded according to the process 1400.

For simplicity of explanation, each of the processes 1300 and 1400 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
   determining, from an indication in an encoded bitstream, whether a prediction process of an encoder received a group of frames in an input order, the input order comprises one of a display order or a reversed display order, and the group of frames formed of a proper subset of frames of a video sequence having the display order;
   performing a prediction process of a decoder for the group of frames by:
      receiving, from the encoded bitstream, the group of frames as input to the prediction process of the decoder in a coding order arranged using a group coding structure that modifies the input order such that an individual frame of the group of frames is input to the prediction process before an adjacent, preceding frame only if the individual frame is used as a backward prediction frame within a set of candidate reference frames; and
      predicting the group of frames in the coding order using the set of candidate reference frames;
   generating a decoded group of frames using prediction results of the prediction process; and
   responsive to the input order being the reversed display order:
      buffering the decoded group of frames until all of the frames of the decoded group of frames are generated; and
      outputting the buffered decoded frames in the display order after all of the frames of the decoded group of frames are buffered.

2. The method of claim 1, wherein determining whether the prediction process of the encoder received the group of frames as input in one of the display order or the reversed display order comprises:
   reading a bit encoded into the encoded bitstream with the encoded group of frames.

3. The method of claim 2, wherein the determination that the prediction process of the encoder received the group of frames as input in the reversed display order results responsive to the bit having a value of 1.

4. The method of claim 1, wherein the group of frames comprises, in the display order, a first frame preceded by a key or overlay frame, a last frame, and at least two intervening frames between the first frame and the last frame, and wherein the coding order comprises the first frame preceded by the key or overlay frame, followed by the last frame, and the at least two intervening frames following the last frame in the reversed display order.

5. The method of claim 1, wherein the group of frames comprises, in the display order, a first frame preceded by an key or overlay frame, a last frame, and at least a first intervening frame and a second intervening frame between the first frame and the last frame, and wherein the coding order comprises the first frame preceded by the key or overlay frame, followed by the second intervening frame, the last frame, and the first intervening frame.

6. An apparatus, comprising:
a processor; and
a non-transitory storage medium that includes instructions executable by the processor to carry out a method comprising:
determining, from an indication in an encoded bitstream, whether a prediction process of an encoder received a group of frames in an input order, the input order comprises one of a display order or a reversed display order, and the group of frames formed of a proper subset of frames of a video sequence having the display order;
performing a prediction process of a decoder for the group of frames by:
receiving, from the encoded bitstream, the group of frames as input to the prediction process of the decoder in a coding order arranged using a group coding structure that modifies the input order such that an individual frame of the group of frames input to the prediction process before an adjacent, preceding frame only if the individual frame is used as a backward prediction frame within a set of candidate reference frames; and
predicting the group of frames in the coding order using the set of candidate reference frames;
generating a decoded group of frames using prediction results of the prediction process; and
responsive to the input order being the reversed display order:
buffering each of the decoded group of frames until all of the frames of the decoded group of frames are generated; and
outputting the buffered decoded group of frames in the display order only after all of the frames of the decoded group of frames are buffered.

7. The apparatus of claim 6, wherein the video sequence is formed of multiple groups of frames, each of the multiple groups of frames is formed of a disjoint set of the frames of the video sequence, and the input order of at least one of the multiple groups of frames is the reversed display order.

8. The apparatus of claim 6, wherein the video sequence is formed of multiple groups of frames, each of the multiple groups of frames is formed of a disjoint set of the frames of the video sequence, and the method further comprises:
transmitting, within the encoded bitstream including the multiple groups of frames, a bit before each group of the multiple groups of frames indicating respectively whether the input order for the group is the reversed display order or whether the input order for the group is the display order.

9. The apparatus of claim 6, wherein the video sequence is formed of multiple groups of frames, each of the multiple groups of frames is formed of a disjoint set of the frames of the video sequence, and each group of the multiple groups of frames is preceded by a key or overlay frame, the key or overlay frame forming a candidate reference frame within the set of candidate reference frames for the group.

10. The apparatus of claim 6, wherein the group coding structure is a hierarchical, multi-layer group coding structure that defines multiple backward reference frames for inclusion in the set of candidate reference frames for at least some frames of the group of frames.

11. A method of decoding a group of frames formed of a proper subset of frames of a video sequence having a display order, comprising:
decoding, from an encoded bitstream, an encoding order, the encoding order indicating whether the group of frames was encoded in the display order or a reversed display order;
performing a prediction process of a decoder for the group of frames by:
receiving, from the encoded bitstream, the group of frames as input to the prediction process of the decoder in a coding order arranged using a group coding structure that modifies an input order such that an individual frame of the group of frames is input to the prediction process before an adjacent, preceding frame only if the individual frame is used as a backward prediction frame within a set of candidate reference frames; and
predicting the group of frames in the coding order using the set of candidate reference frames;
generating a decoded group of frames using prediction results of the prediction process; and
responsive to the input order being the reversed display order:
buffering the decoded group of frames until all of the frames of the decoded group of frames are generated; and
outputting the buffered decoded frames in the display order after all of the frames of the decoded group of frames are buffered.

12. The method of claim 11, wherein determining whether the prediction process of the encoder received the group of frames as input in one of the display order or the reversed display order comprises:
reading a bit encoded into the encoded bitstream with the encoded group of frames.

13. The method of claim 12, wherein the determination that the prediction process of the encoder received the group of frames as input in the reversed display order results responsive to the bit having a value of 1.

14. The method of claim 11, wherein the group of frames comprises, in the display order, a first frame preceded by a key or overlay frame, a last frame, and at least two intervening frames between the first frame and the last frame, and wherein the coding order comprises the first frame preceded by the key or overlay frame, followed by the last frame, and the at least two intervening frames following the last frame in the reversed display order.

15. The method of claim 11, wherein the group of frames comprises, in the display order, a first frame preceded by an key or overlay frame, a last frame, and at least a first intervening frame and a second intervening frame between the first frame and the last frame, and wherein the coding order comprises the first frame preceded by the key or overlay frame, followed by the second intervening frame, the last frame, and the first intervening frame.

* * * * *